United States Patent [19]

Noël

[11] 4,245,073

[45] Jan. 13, 1981

[54] PROCESS FOR THE POLYMERIZATION OF VINYL CHLORIDE IN AQUEOUS SUSPENSION

[75] Inventor: Stéphane Noël, Vilvoorde, Belgium

[73] Assignee: Solvay & Cie., Brussels, Belgium

[21] Appl. No.: 682,503

[22] Filed: May 3, 1976

[30] Foreign Application Priority Data

May 26, 1975 [FR] France ............................... 75 16759

[51] Int. Cl.$^3$ ........................... C08F 6/24; C08F 14/06
[52] U.S. Cl. ........................... 526/230.5; 260/45.85 B; 260/45.85 E; 525/366; 525/378; 526/202; 526/212; 526/344.2; 528/480; 528/483; 528/488; 528/489; 528/490; 528/500; 528/501
[58] Field of Search ............... 528/480, 488, 489, 490, 528/499, 500, 501, 483; 525/344.2; 526/230.5

[56] References Cited

U.S. PATENT DOCUMENTS

| | | | |
|---|---|---|---|
| 2,387,571 | 10/1945 | Fikentscher | 528/503 X |
| 3,451,985 | 6/1969 | Mahlo | 526/230 X |
| 3,476,727 | 11/1969 | Monaco | 526/230 X |
| 3,546,192 | 12/1970 | Borsini | 528/489 |
| 3,622,553 | 11/1971 | Cines | 526/344 X |
| 3,635,928 | 1/1972 | Thomas | 528/488 X |
| 3,663,520 | 5/1972 | Balwe | 526/344 X |
| 3,716,507 | 5/1973 | Glomski | 526/230 X |
| 3,956,249 | 5/1976 | Goodman | 528/500 |

FOREIGN PATENT DOCUMENTS 865802 3/1971 Canada ............................... 526/344 X

*Primary Examiner*—C. A. Henderson
*Attorney, Agent, or Firm*—Spencer & Kaye

[57] ABSTRACT

Process for the polymerization of vinyl chloride in aqueous suspension in the presence of dialkyl peroxydicarbonates in which the polymer is treated with a monobasic hydroxide at the end of polymerization and before the unreacted vinyl chloride is removed. The alkaline treatment is advantageously applied to polymers that are subsequently subjected to steam stripping.

The treatment improves the initial heat stability of vinyl chloride polymers.

20 Claims, No Drawings

PROCESS FOR THE POLYMERIZATION OF VINYL CHLORIDE IN AQUEOUS SUSPENSION

BACKGROUND OF THE INVENTION

The present invention relates to a process for polymerising vinyl chloride in aqueous suspension to give polymers possessing improved initial heat stability. It relates more particularly to a process in which polymerisation is carried out in the presence of dialkyl peroxydicarbonate initiators.

Dialkyl peroxydicarbonates are known to be particularly active initiators. They therefore possess the advantage of improving the productivity of polymerisation plants. Unfortunately the resulting polymers lead to shaped articles such as tubes, tubular film and bottles whose initial heat stability leaves much to be desired.

The initial heat stability is the ability of the polymer to withstand the degradation caused by the increase in temperature to which it must be subjected for incorporating various additives and for processing it. Poor initial heat stability manifests itself by a deterioration in the initial colour which is more pronounced the lower the stability.

It has already been suggested to improve stability by a treatment subsequent to polymerisation which consists in contacting the polymers with an aqueous alkaline solution, preferably containing a phenolic antioxidant (Canadian Pat. No. 865,802 of Feb. 9, 1970 to Esso Research and Engineering). Vinly chloride polymers which have undergone such a treatment exhibit slightly improved heat stability in certain specific formulations such as those containing tin. However, the initial heat stability is generally inferior to that of untreated polymers as far as many formulations are concerned. The effectiveness and applications of this treatment are therefore very limited.

SUMMARY OF THE INVENTION

There has now been found, in accordance with the present invention, a remarkably effective treatment for improving the initial heat stability of vinyl chloride polymers polymerised in suspension in the presence of dialkyl peroxydicarbonates. This treatment can be used substantially universally whatever the formulation employed when processing the polymer.

The present invention accordingly relates to a process for polymerising vinyl chloride in which the vinyl chloride is polymerised in aqueous suspension in the presence of dialkyl peroxydicarbonates, the polymer is treated with a hydroxide and the treatment of the polymer is carried out with a monobasic hydroxide at the end of polymerisation and before the unreacted vinyl chloride has been removed.

DETAILED DESCRIPTION OF THE INVENTION

It has in fact been found that to obtain a significant improvement in the initial heat stability of the polymers in question it is imperative for treatment with the hydroxide to be carried out at the end of polymerisation when the desired conversion has been achieved.

Generally speaking polymerisation is terminated after about 90–95% of the vinyl chloride present in the reactor has been converted. 5–10% of unreacted vinyl chloride therefore remain at this point. A very substantial proportion of this unreacted vinyl chloride is customarily removed from the aqueous suspension by volatilisation, which is brought about by reducing the pressure. This operation is known as degassing. After degassing, the medium merely contains an amount of the order of 10 g of unreacted vinyl chlorie per 1 kg of polymer. Most of this residual vinyl chloride is occluded in the interior of the polymer particles. It has been found that using the hydroxide before the end of degassing greatly increases the effectiveness of the treatment. Treatment is preferably carried out while the aqueous suspension still contains at least 25 g of unreacted vinyl chloride per 1 kg of polymer. The best results are obtained when the content is at least 50 g of vinyl chloride per 1 kg.

The treatment according to the invention can be carried out very easily by adding the hydroxide straight to the aqueous suspension while it is still in the polymerisation reactor.

The amount of hydroxide to be introduced into the aqueous suspension is not critical. The introduction of only small amounts of hydroxide enables the initial heat stability of the polymer to be increased. It is preferred however to use sufficient hydroxide to bring the pH of the aqueous suspension to at least 7. it is also preferred not to exceed a pH of 12 during the treatment to avoid any risk of degradation of the polymer, e.g. by dehydrochlorination. Preferably sufficient alkaline hydroxide is used to bring the pH of the aqueous suspension to a value of between 9 and 10.5.

The nature of the monobasic hydroxide employed is not critical. It may be selected from the alkali metal hydroxides such as sodium, potassium and lithium hydroxides and ammonium hydroxide. Water-soluble hydroxides of alkaline earth metals are unsuitable for the process according to the invention however.

An alkaline hydroxide that is particularly preferred is ammonium hydroxide. Because of its high volatility this hydroxide does not appear in the final polymer. Its use ensures that polymers are obtained that possess an array of highly desirable properties, in this case not only excellent initial heat stability but also great transparency and good electrical properties.

The method of introduction of the hydroxide is in no way critical. For instance it can be introduced into the aqueous suspension all at once, batchwise or continuously. Moreover, the hydroxide may be introduced in solid form or as a solution in a liquid that is inert under the polymerisation conditions. It is even possible to introduce ammonia. Preferably, the hydroxide is introduced into the aqueous suspension in the form of a solution and more particularly an aqueous solution. The concentration of the aqueous hydroxide solution is immaterial. However, N/10 to 10 N and preferably normal to 5 N solutions are generally used for practical reasons.

According to a particularly preferred embodiment of the present invention the aqueous polymer suspension is treated before total degassing with sufficient ammonium hydroxide to bring the pH to a value of between 9 and 10.5. This objective is achieved under the conventional conditions for polymerising vinyl chloride in aqueous suspension by using an amount of ammonium hydroxide that corresponds to about 0.05 to 1 part by weight of ammonia per 100 parts of vinyl chloride initially used.

The duration of the treatment according to the invention is not critical. Results are already apparent after a few minutes in actual practice. These results can be improved by extending the treatment time. However, to avoid useless prolongation of the total cycle time for the production of the polymer, the polymer is generally maintained in contact with the alkaline hydroxide for about 5-120 minutes and preferably for about 5-20 minutes before complete degassing.

The temperature at the moment at which the treatment according to the invention starts is customarily that of the aqueous suspension at the end of polymerisation, since treatment can be carried out as soon as the desired conversion has been achieved. It is not vital to maintain the temperature constant during treatment, however. It can therefore be reduced or increased and is generally between 20° and 140° C. and preferably between 20° and 80° C.

It is also not essential to carry out the treatment with stirring. However, it is advantageous to provide for stirring in order to ensure rapid and efficient dispersion of the hydroxide within the aqueous polymer suspension and hence to shorten the treatment time as much as possible. In practice therefore the stirrer used during polymerisation is kept in action during the treatment according to the invention when treatment is carried out in the polymerisation reactor.

According to the preferred embodiment of the process according to the invention the polymer is subjected to stripping with an inert fluid after treatment by the monobasic hydroxide.

A treatment of this kind is described in Luxemburg patent Nos. 70739 filed on Aug. 14, 1974, and 72112 filed on Mar. 21, 1975. It has been found that if the treatment according to the invention is combined with stripping with an inert fluid the initial heat stability is further increased to a notable extent.

Stripping with an inert fluid is customarily carried out on the aqueous polymer suspension when the latter is at a temperature at least equal to the polymerisation temperature. It is preferably conducted at a temperature at least equal to the glass transition temperature of the polymer. When it is combined with the treatment according to the invention stripping is preferably preceded by degassing of the aqueous suspension to remove the major part of the vinyl chloride present in the aqueous suspension at the end of treatment by the hydroxide. The main effect of stripping is to remove the final traces of vinyl chloride occluded in the polymer particles.

As with treatment by the hydroxide, stripping can be carried out in the polymerisation reactor. It is also possible to use another vessel specially designed for the purpose and preferably provided with a stirrer. The polymer is conveyed to it in the form of an aqueous suspension, e.g. after degassing in the reactor. It is also possible to modify the polymer concentration in the aqueous suspension before stripping. It is preferable however to carry out the treatment according to the invention in the polymerisation reactor and then to transfer the aqueous polymer suspension into a special vessel where degassing and stripping with an inert fluid are carried out if necessary.

The term "inert fluid" as used herein refers to inert gases such as nitrogen and carbon monoxide or vapours of liquids that are inert and volatile at the stripping temperature as for example pentane, hexane, chloroform, carbon tetrachloride and water. It is particularly advantageous to use steam as the inert stripping fluid. At least part of the steam used as the stripping fluid can be generated in situ by causing the aqueous suspension to boil.

However, it is preferred to introduce the steam, which is preferably super-heated, into the aqueous suspension.

The temperature at which stripping with an insert fluid is carried out may be of the same order as that employed for the treatment with the hydroxide. It is particularly advantageous, however, as was pointed out above, to carry out stripping with an inert fluid at a temperature at least equal to the glass transition temperature of the polymer. The glass transition temperature is advantageously determined by differential thermal analysis which gives a reasonably accurate reading.

The aqueous suspension emerging from treatment with the hydroxide can therefore be heated to bring it to a temperature at least equal to the glass transition temperature of the polymer before subjecting it to stripping with a fluid. Heating the aqueous suspension may be carried out by any appropriate means, as for example by circulating a hot fluid through the double jacket of the vessel containing the aqueous suspension and/or by directly blowing in a hot inert fluid such as air, nitrogen or steam. It is preferred to inject steam however as the use of steam enables the desired temperature to be reached in a very short time.

The upper temperature limit at which stripping with an inert fluid can be carried out is imposed by the degradation temperature of the polymer, to which a conventional heat stabilizer may be added if desired.

It should be noted however that heating to temperatures appreciably above 100° constitutes a pointless waste of energy. Furthermore, an aqueous dispersion treated at an elevated temperature must then be cooled before it can be centrifuged and this increases the cooling time and/or the volume of cooling liquid required.

For these reasons it is preferable to maintain the aqueous suspension at a temperature not exceeding 140° C. and preferably 120° C. during stripping with the inert fluid.

The temperature of the inert fluid used for stripping the residual monomer and optionally for the prior heating of the aqueous suspension is immaterial. The total treatment time of the aqueous suspensions will obviously be shorter the higher the temperature of the heating fluid.

The stripping time is likewise not a critical parameter.

Consequently it can be readily determined experimentally for each particular case. As a rough guide a few minutes to about 2 hours and more particularly 5 to 45 minutes generally suffice for reducing the residual vinyl chloride content to a few tens of parts per million by weight with respect to the polymer. After centrifuging and drying under conventional conditions these suspensions result in vinyl chloride polymers which contain less than 2 ppm by weight of residual monomer in optimum cases.

Finally it may be advantageous to supplement stripping with a fluid by reducing the pressure to cause the aqueous suspension to boil.

The polymerisation conditions for the polymers treated in accordance with the invention are the classis conditions used in the polymerisation of vinyl chloride in aqueous suspension in the presence of dialkyl peroxydicarbonates.

The term "polymerisation of vinyl chloride" as used herein refers to the homopolymerisation and copolymerisation of vinyl chloride with comonomers. The vinyl chloride content of the polymer preferably exceeds 50% and more particularly 80% molar. The comonomers may be selected from monomers that are copolymerisable with vinyl chloride such as vinyl acetate, propylene and ethylene.

The polymerisation of the vinyl chloride is carried out in the presence of the conventional ingredients for polymerisation in aqueous suspension, i.e. suspension agents together, if required, with sundry additives added at any stage of polymerisation such as stabilisers (eg epoxidised soya oil), plasticisers (eg dialkyl phthalates), sundry colorants and pigments, reinforcing agents (eg methacrylonitrile/butadiene/styrene resins), processing aids (eg stearic acid or fatty alcohols) or antioxidants such as thioethers, organic phosphites or phenolic compounds. Examples of such compounds include phenol, bisphenol A, hydroquinone, p-tertiary-butyl catechol, p-tertiary-butyl cresol, tris(2-methyl, 4-hydroxy-5-tertiary butyl phenyl) butane, n-octadecyl, 3(3,5-ditertiary butyl,4-hydroxyphenyl) propionate etc.

Because of their inhibiting effect on polymerisation, antioxidant compounds are, if desired, preferably introduced into the aqueous suspension at the end of polymerisation and before the unreacted vinyl chloride is removed. Their incorporation into the polymerisation medium advantageously precedes treatment with a monobasic hydroxide in accordance with the invention.

The suspension agent may be selected from conventional suspension agents as, for example, polyvinyl alcohols, gelatin, water-soluble alkyl celluloses and carboxymethyl celluloses and various copolymers and condensation products as, for example, the products obtained by the condensation of polyalkylene glycols and polyamides. Mixtures of suspension agents may of course be used and their method of introduction is not critical.

All dialkyl peroxydicarbonates are suitable as initiators for the polymerisation of vinyl chloride by the process of the present invention. These initiators correspond to the following general formula:

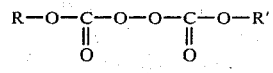

where R and R' denote aliphatic radicals which may be the same or different and may be optionally substituted, eg by halogen atoms. However, the use of peroxydicarbonates with long alkyl chains which are generally solid may lead to metering or conveying problems. It is therefore preferable to use dialkyl peroxydicarbonates whose alkyl chains contain not more than 9 carbon atoms and preferably from 1 to 4 carbon atoms. A peroxydicarbonate that is more particularly preferred is diethyl peroxydicarbonate.

Furthermore, it is when the process according to the invention is applied to the polymerisation of vinyl chloride in the presence of dialkyl peroxydicarbonates whose alkyl radicals contain from 1 to 9 carbon atoms and preferably from 1 to 4 carbon atoms that the improvement in the heat stability of the vinyl chloride polymers is most marked.

The vinyl chloride polymers treated in accordance with the present invention can be used for all classic applications of such polymers. They are particularly suitable for use in formulations which are critical from the standpoint of the initial heat stability, and under severe processing conditions. Those that have also been subjected to stripping with a fluid and contain substantially no residual vinyl chloride are remarkably suitable for use in the production of packaging containers for foodstuffs.

The following examples illustrate the invention without, however, limiting it. They relate to the polymerisation of vinyl chloride in aqueous suspension in the presence of diethyl peroxydicarbonate as initiator.

The short-term heat stability (initial colour) of the polymers is assessed on a crêpe obtained by compounding the three following compositions for about 2 minutes at 180° C. (on rolls).

| Composition, parts by weight: | A | B | C |
|---|---|---|---|
| dry resin | 100 | 100 | 100 |
| dioctyl phthalate | 40 | 30 | — |
| tribasic lead sulphate | 2 | — | — |
| lead stearate | — | — | 0.5 |
| barium/cadmium stabilizer | — | 1 | — |
| basic load carbonate | — | — | 1.03 |
| calcium carbonate | — | — | 0.6 |
| polyethylene wax | 0.5 | — | 0.2 |
| stearic acid | 0.5 | 0.5 | — |

EXAMPLE 1

1500 g of demineralised water, 1.2 g of polyvinyl alcohol and 0.35 g of diethyl peroxydicarbonate are introduced at room temperature and with agitation (200 rpm) into a 3 liter autoclave provided with a stirrer and a double jacket. The autoclave is closed, stirring is stopped and the autoclave is placed under partial vacuum (100 mm Hg), after which it is purged with nitrogen (600 mm Hg absolute) before restoring the same partial vacuum. 1000 g of vinyl chloride are then introduced. The stirrer is restarted (500 rpm) and the medium heated to 60° C. This moment, at which polymerisation starts, is regarded as being the start of the complete polymerisation cycle.

After 3 hours, 300 g of demineralised water are introduced and polymerisation is continued until the pressure drop in the autoclave reaches 3 kg/cm². 172 cc of a N/10 solution of ammonium hydroxide are then introduced into the reactor and stirring is continued for 10 minutes.

At the end of this period the aqueous suspension is degassed by reducing the pressure to 500 mm Hg absolute and the polymer is centrifuged and dried under the usual conditions (at 65° C. for 2 hours).

The initial heat stability of the resulting polyvinyl chloride in formulations A, B and C is given in the attached table. The glass transition temperature determined by differential thermal analysis is 80° C.

EXAMPLE 2 (reference)

This Example relates to the polymerisation of vinyl chloride under conditions that conform to those of Example 1. However, as soon as the pressure drop in the reactor reaches 3 kg/cm² the aqueous suspension is degassed and the polymer is centrifuged and then dried at 65° C. for 2 hours.

The initial heat stability of the resulting polyvinyl chloride in formulations, A, B and C is given in the attached table.

EXAMPLE 3

The polymerisation conditions and the conditions under which the aqueous suspension is treated with ammonium hydroxide are the same as those of Example 1. However, after degassing, the degassed aqueous suspension is transferred to a 7.5 liter tank provided with a steam inlet pipe immersed in the tank which is maintained at atmospheric pressure. A sample of the aqueous suspension is taken to determine its vinyl chloride content which is found to be 1200 mg of vinyl chloride per kg of polyvinyl chloride. Superheated steam at 152° C. is introduced into the aqueous suspension by the dip pipe. The aqueous suspension which was initially at about 60° C. heats up rapidly in contact with the steam which condenses therein. When the aqueous suspension reaches a temperature of 100° C. (boiling point) substantially no further steam condenses and the steam is eliminated directly, taking with it the residual vinyl chloride. The supply of superheated steam is cut off after the aqueous suspension has been subjected to steam stripping for 15 minutes at 100° C. and a second sample of the aqueous suspension is taken before cooling, centrifuging and drying the polymer.

After steam stripping, the vinyl chloride content of the aqueous suspension is 10 mg of vinyl chloride per kg of polyvinyl chloride and the dry polymer contains less than 1 mg of vinyl chloride per kg of dry polymer.

The initial heat stability of the polyvinyl chloride in formulations A, B and C is given in the attached table.

EXAMPLE 4 ( reference)

This example conforms to Example 1 except that treatment with ammonium hydroxide is carried out after the degassing of the aqueous suspension.

The initial heat stability of the polyvinyl chloride in formulations A, B and C is given in the attached table.

EXAMPLE 5 (reference)

This example relates to the polymerisation of vinyl chloride under the conditions of Example 2 except that the degassed aqueous suspension is subjected to steam stripping under the conditions described in Example 3.

The initial heat stability of the polyvinyl chloride is given in the attached table.

A comparison of Example 1 with Examples 2 and 4 shows that alkaline treatment of the aqueous suspension before degassing appreciably improves the initial colour of the polyvinyl chloride resins (Example 2) to an extent that is clearly superior to that of the prior art process (Example 4).

Example 3 shows that the initial heat stability can be still further improved by subjecting the aqueous suspension that has been treated in accordance with the invention to stripping with an inert fluid.

Finally the reference Example 5 was provided to show that the improvement in the initial heat stability that results from the alkaline treatment according to the invention associated with stripping with an inert fluid (Example 3) is greater than one could have anticipated (Examples 1 and 5).

The alkaline treatment of the aqueous suspension before degassing therefore constitutes a particularly effective and simple means of improving the initial colour of the vinyl chloride polymers.

Furthermore when this alkaline treatment according to the invention is combined with stripping of the residual monomer with an inert fluid, vinyl chloride polymers are obtained that exhibit an even greater improvement in the initial colour and are substantially free from residual monomer.

EXAMPLE 6

This example conforms to Example 1 except that the introduction of the ammonium hydroxide solution is preceded by the injection of 0.5 g of tris(2-methyl 4-hydroxy, 5-tertiary butyl phenyl) butane dissolved in 0.5 g of dichloromethane.

The initial heat stability of the resulting polyvinyl chloride in formulations A, B and C is given in the following table.

TABLE

| No. of Example | Initial heat stability of compounded crepes | | |
|---|---|---|---|
| | A | B | C |
| 1 | White | Very pale pink | Beige |
| 2 (Ref.) | Pink plus a few red spots | Deep pink plus many red spots | Brown |
| 3 | White | Colouress | Pale beige |
| 4 (Ref.) | Reddish plus red spots | Deep pink | Brown |
| 5 (Ref.) | Pink | Pink | Deep beige |
| 6 | White | Very pale pink | Pale beige |

I claim:
1. In a process for the polymerisation of vinyl chloride in which vinyl chloride is polymerised in aqueous suspension in the presence of a dialkyl peroxydicarbonate and in which the polymer is treated with a hydroxide, the improvement consisting essentially in treating the polymer in the aqueous suspension with a monobasic hydroxide when the desired conversion has been achieved and before the unreacted vinyl chloride is removed.

2. Process as in claim 1, wherein the amount of monobasic hydroxide used is such that the pH of the aqueous suspension is at least 7.

3. Process as in claim 1, wherein the amount of monobasic hydroxide used is such that the pH of the aqueous suspension does not exceed 12.

4. Process as in claim 1, wherein the amount of monobasic hydroxide used is such that the pH of the aqueous suspension is between 9 and 10.5.

5. Process as in claim 1, wherein the monobasic hydroxide is selected from ammonium, lithium, potassium and sodium hydroxides.

6. Process as in claim 5, wherein the monobasic hydroxide is ammonium hydroxide.

7. Process as in claim 1, wherein the monobasic hydroxide is used in the form of an aqueous solution.

8. Process as in claim 1, wherein the aqueous suspension that is treated still contains at least 10 g of vinyl chloride per 1 kg of polymer.

9. Process as in claim 1, wherein the aqueous suspension is treated with the monobasic hydroxide for between 5 and 120 minutes.

10. Process as in claim 1, wherein an antioxidant is incorporated in the aqueous suspension.

11. Process as in claim 10, wherein the antioxidant is incorporated at the end of polymerisation and before the unconverted vinyl chloride is removed.

12. Process as in claim 10, wherein the incorporation of the antioxidant precedes the treatment of the polymer with a monobasic hydroxide.

13. Process as in claim 10, wherein the antioxidant is a phenolic compound.

14. Process as in claim 1, wherein the aqueous suspension treated with the monobasic hydroxide is subjected to stripping with an inert fluid.

15. Process as in claim 14, wherein the inert fluid is steam.

16. Process as in claim 14, wherein the treated aqueous suspension is degassed before being subjected to stripping.

17. Process as in claim 14, wherein the treated aqueous suspension is heated to a temperature at least equal to the glass transition temperature of the polymer and is maintained at a temperature at least equal to the glass transition temperature of the polymer during stripping with an inert fluid.

18. Process as in claim 1, wherein the polymer is treated with ammonium hydroxide in an amount which is such that the pH of the suspension is between 9 and 10.5 while the aqueous suspension still contains at least 25 g of vinyl chloride per 1 kg of polymer.

19. Process as in claim 1, wherein the aqueous suspension is an aqueous suspension of a vinyl chloride polymer polymerised in the presence of a dialkyl peroxydicarbonate whose alkyl chains contain from 1 to 9 carbon atoms.

20. Process as in claim 19, wherein the alkyl chains contain from 1 to 4 carbon atoms.

* * * * *